United States Patent
Tsai et al.

(10) Patent No.: US 9,152,856 B2
(45) Date of Patent: Oct. 6, 2015

(54) PEDESTRIAN DETECTION SYSTEM AND METHOD

(71) Applicant: INSTITUTE FOR INFORMATION INDUSTRY, Taipei (TW)

(72) Inventors: Augustine Tsai, Taipei (TW); Jui-Yang Tsai, Tainan (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 131 days.

(21) Appl. No.: 14/133,668

(22) Filed: Dec. 19, 2013

(65) Prior Publication Data

US 2015/0178557 A1 Jun. 25, 2015

(51) Int. Cl.
*G06K 9/46* (2006.01)
*G06K 9/00* (2006.01)
*G06K 9/48* (2006.01)

(52) U.S. Cl.
CPC .......... *G06K 9/00362* (2013.01); *G06K 9/4642* (2013.01); *G06K 9/48* (2013.01)

(58) Field of Classification Search
None
See application file for complete search history.

(56) References Cited

U.S. PATENT DOCUMENTS

| | | | |
|---|---|---|---|
| 6,480,616 B1 * | 11/2002 | Hata et al. | 382/106 |
| 8,131,011 B2 | 3/2012 | Nevatia et al. | |
| 2005/0053309 A1 * | 3/2005 | Szczuka et al. | 382/284 |

FOREIGN PATENT DOCUMENTS

| | | |
|---|---|---|
| TW | 201044008 A | 12/2010 |
| TW | 201223267 A | 6/2012 |

OTHER PUBLICATIONS

The examination report of the corresponding Taiwan application No. TW103100860.
Navneet Dalai and Bill Triggs, Histograms of Oriented Gradients for Human Detection.

* cited by examiner

*Primary Examiner* — Mark Roz
(74) *Attorney, Agent, or Firm* — CKC & Partners Co., Ltd.

(57) ABSTRACT

A pedestrian detection system of detecting whether there is a pedestrian in a scene, the pedestrian detection system includes an image-capturing module, a preprocessing module, a human detection module, an image-stitching module and a decision module. The image-capturing module is configured for generating a plurality of first detection image data according to a contrast decision result. The preprocessing module is configured for generating a plurality of first image skeleton data according to the first detection image data. The human detection module is configured for generating a plurality of second image skeleton data. The image-stitching module is configured for stitching the plurality of first detection image data to generate at least one third detection image data. The decision module is configured for generating and outputting a detection result according to the third detection image data. A pedestrian detection method is disclosed herein as well.

16 Claims, 8 Drawing Sheets

PEDESTRIAN DETECTION SYSTEM AND METHOD

BACKGROUND

1. Technical Field

The present disclosure relates to a detection and identification system. More particularly, the present disclosure relates to a pedestrian detection system and method.

2. Description of Related Art

With the advancement of modern technology, applications of pedestrian detection systems have become more and more popular. For example, pedestrian detection systems could be implemented in vehicles to detect where there is a pedestrian in front of the vehicles and warn the drivers if there is a risk of collisions such that the traffic safety could be improved.

However, the detection accuracy of current pedestrian detection systems sometimes drops a lot due to various interfering factors of scenes to be detected. For example, the lighting upon pedestrians is too much or not enough in the environments with non-uniform distribution of light, or parts of the bodies of pedestrians are blocked by obstacles. In the abovementioned two circumstances, the detection accuracy of current pedestrian detection systems is not satisfactory.

SUMMARY

In one aspect, the present disclosure is related to a pedestrian detection system of detecting whether there is a pedestrian in a scene, the pedestrian detection system includes an image-capturing module, a preprocessing module, a human detection module, an image-stitching module and a decision module. The image-capturing module is configured for generating a plurality of image data of the scene, in which each of the image data has a distinct exposure; for generating a contrast decision result according to a histogram of one of the image data; and for assigning at least one of the image data as a plurality of first detection image data according to the contrast decision result. The preprocessing module is configured for generating a plurality of first image skeleton data labeled with regions of interests according to the first detection image data. The human detection module is configured for determining whether there is a human characteristic in at least one of the regions of interests of the first image skeleton data. If so, the human detection module generates a plurality of second image skeleton data labeled with regions of human characteristics. If not, the human detection module outputs a detection result. The image-stitching module is configured for stitching the plurality of first detection image data to generate at least one third detection image data. The decision module is configured for generating and outputting the detection result according to the third detection image data.

In another aspect, the present disclosure is related to a pedestrian detection method of detecting whether there is a pedestrian in a scene, the pedestrian detection method includes the following steps: generating a plurality of image data of the scene, in which each of the image data has a distinct exposure; generating a contrast decision result according to a histogram of one of the image data; assigning at least one of the image data as a plurality of first detection image data according to the contrast decision result; generating a plurality of first image skeleton data labeled with regions of interests according to the first detection image data; determining whether there is a human characteristic in at least one of the regions of interests of the first image skeleton data, if so, generating a plurality of second image skeleton data labeled with regions of human characteristics, and if not, outputting a detection result; stitching the plurality of first detection image data to generate at least one third detection image data; and generating and outputting the detection result according to the third detection image data.

DETAILED DESCRIPTION

Figure 1:
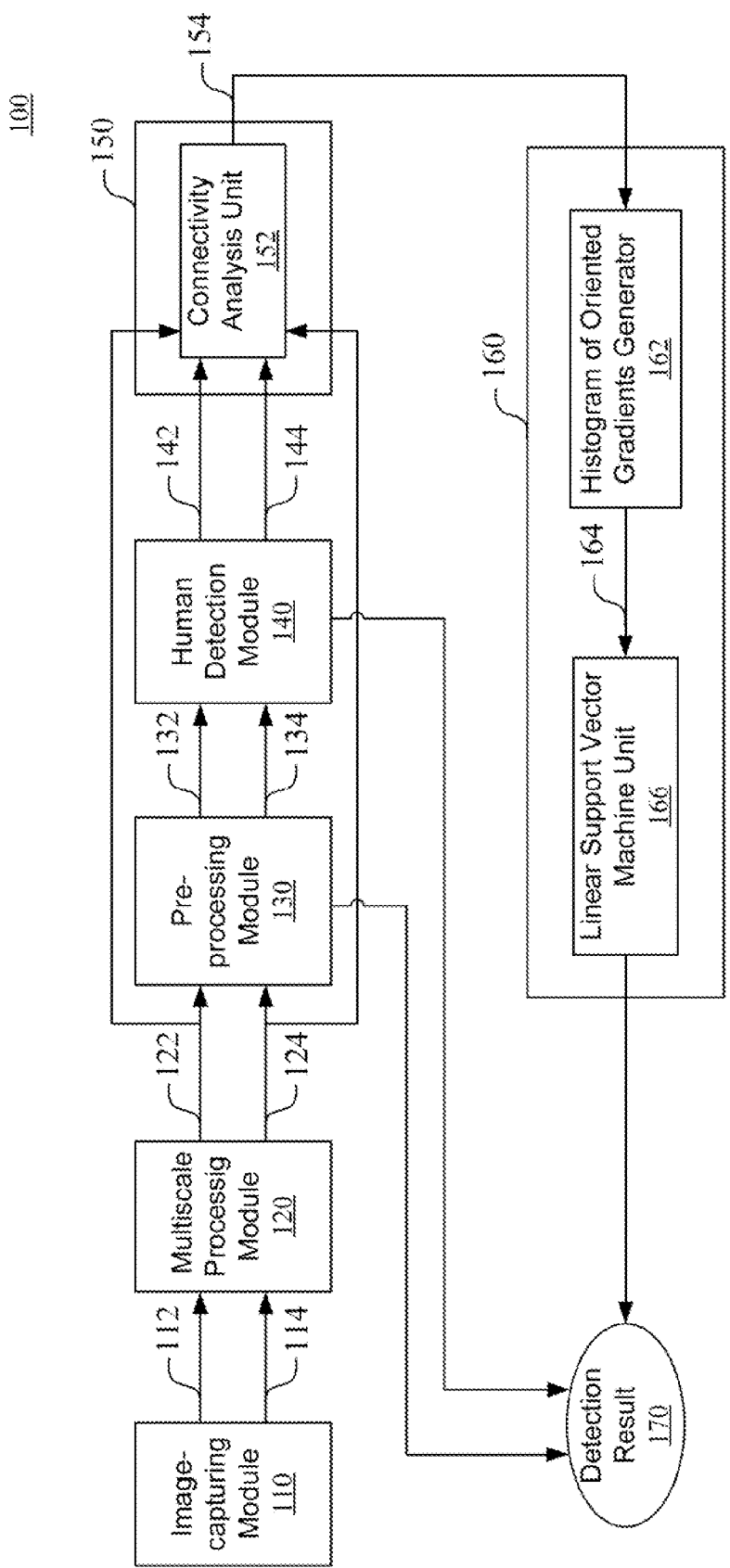
FIG. 1 is a schematic diagram of a pedestrian detection system in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a pedestrian detection system 100 in accordance with one embodiment of the present disclosure. The pedestrian detection system 100 is applicable for detecting whether there is a pedestrian in a scene. For example, the scene to be detected could be a road, a pedestrian overpass, an underground passage or a railroad crossing. The pedestrian detection system 100 could be implemented in a traffic monitor, a security system or a movable device (for example, any transport vehicle). The pedestrian detection system 100 includes an image-capturing module 110, a preprocessing module 130, a human detection module 140, an image-stitching module 150 and a decision module 160. A multiscale processing module 120 is selectively included in the pedestrian detection system 100.

The image-capturing module 110 is configured for generating a plurality of image data of the scene to be detected, in which each of the image data has a distinct exposure; for generating a contrast decision result according to a histogram of one of the image data; and for assigning at least one of the image data as detection image data 112 and 114 according to the aforementioned contrast decision result.

In an embodiment of the present disclosure, the image-capturing module 110 generates 3 image data of a scene to be detected by controlling a digital camera to shoot continuously 3 photos of the scene to be detected with exposures EV0, EV-H and EV-L, respectively. In another embodiment of the present disclosure, the image-capturing module 110 controls a digital camera to shoot a photo of a scene to be detected with an auto exposure EV0, and employs an image processing technique to increase and lower the exposure of the EV0 photo to generate 3 image data of the scene to be detected with exposure EV0, EV-H and EV-L, respectively. In the following paragraph, we will further explain how the image-capturing module 110 generates the aforementioned contrast decision result according to a histogram of one of the image data of the scene to be detected.

Figure 2:
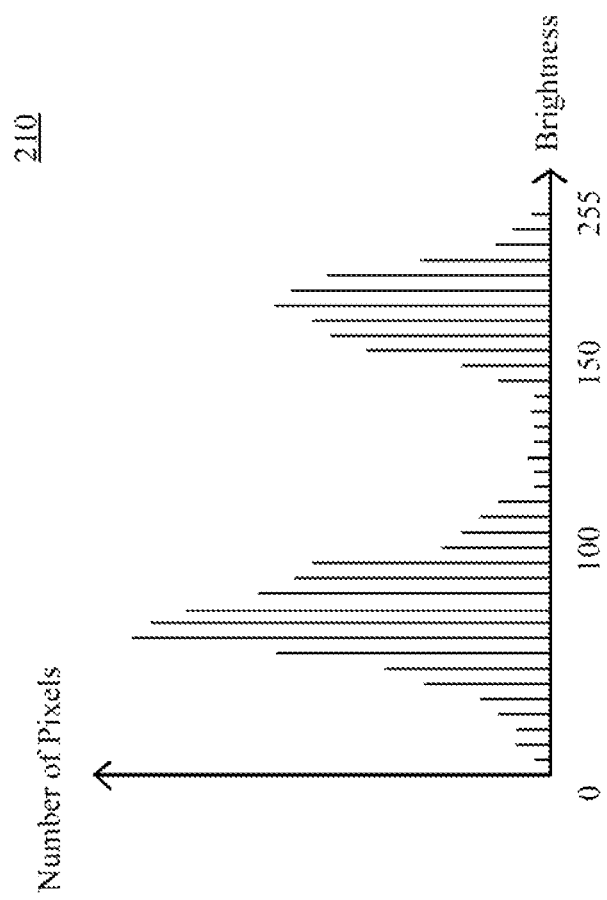
FIG. 2 is a histogram of an image data of a scene to be detected in accordance with one embodiment of the present disclosure.

Please refer to FIG. 2 simultaneously. FIG. 2 is a histogram 210 of an image data of a scene to be detected in accordance with one embodiment of the present disclosure. In this embodiment, the histogram 210 belongs to an image data with exposure EV0. The image-capturing module 110 computes the ratio of the number of pixels within a middle brightness range (for example, the middle brightness range is from brightness 100 to brightness 150) to the number of all pixels in the histogram 210. If the aforementioned ratio is less than a threshold value (for example, 1/2), the image-capturing module 110 describes that the scene to be detected is a high contrast scene in the contrast decision result. If the ratio is not less than the aforementioned threshold value, the image-capturing module 110 describes that the scene to be detected is a low contrast scene in the contrast decision result.

It has to be explained herein that the abovementioned middle brightness range of the histogram is not limited to the range from brightness 100 to brightness 150. In another example, the middle brightness range is from brightness 85 to brightness 170. Also, the abovementioned threshold value is not limited to 1/2. In another example, the threshold value is 1/3.

In this embodiment, if the scene to be detected is described as a high contrast scene in the aforementioned contrast decision result, the image-capturing module 110 selects an image data of the scene having an exposure EV-H and an image data of the scene having an exposure EV-L to serve as detection image data 112 and 114, respectively. If the scene to be detected is described as a low contrast scene in the aforementioned contrast decision result, the image-capturing module 110 selects an image data of the scene having an auto exposure (EV0) to serve to serve as detection image data 112 and 114.

It has to be explained herein that in the present disclosure, the number of detection image data generated by the image-capturing module 110 is not limited to 2 as the embodiment illustrated in FIG. 1 (detection image data 112 and 114). In another embodiments the number of detection image data is 4.

The multiscale processing module 120 is configured for generating a plurality of corresponding different-resolution detection image data 122 and 124 according to the detection image data 112 and 114.

In an example, the resolution of the detection image data 112 and 114 is 1280*960. The multiscale processing module 120 is configured for generating corresponding 3 detection image data 122 with resolution 640*480, 1280*960 and 2560*1920, respectively according to the content of the detection image data 112, and for generating corresponding 3 detection image data 124 with resolution 640*480, 1280*960 and 2560*1920, respectively according to the content of the detection image data 114.

It has to be explained herein that the multiscale processing module 120 is selectively included in the pedestrian detection system 100. Skilled persons can decide whether the multiscale processing module 120 should be included according to user needs. In an embodiment of the present closure in which the multiscale processing module 120 is not included in the pedestrian detection system, the detection image data 122 can be the detection image data 112, and the detection image data 124 can be the detection image data 114.

The preprocessing module 130 is configured for generating a plurality of corresponding image skeleton data 132 and 134 labeled with regions of interests according to the detection image data 122 and 124. In an embodiment of the present disclosure, the detection image data 122 are three different-resolution detection image data 122$x$, 122$y$ and 122$z$, and the detection image data 124 are three different-resolution detection image data 124$x$, 124$y$ and 124$z$ (not depicted) The preprocessing module 130 is configured for normalizing the gamma and the color of 122$x$, 122$y$, 122$z$, 124$x$, 124$y$ and 124$z$, and computing the gradients between pixels of each of the abovementioned 6 detection image data according to normalization results. The preprocessing module 130 then generate corresponding image skeleton data 122$x\_sk$, 122$z\_sk$, 122$z\_sk$, 124$x\_sk$, 124$y\_sk$ and 124$z\_sk$ (not depicted) according to the abovementioned gradients. After that, the preprocessing module 130 performs an edge detection for each of the abovementioned six image skeleton data to detect edge lines or edge curve. The preprocessing module 130 then labels corresponding regions of interests in the abovementioned six image skeleton data according to the detected edge lines or edge curves to generate image skeleton data 122$x\_roi$, 122$y\_roi$, 122$z\_roi$, 124$x\_roi$, 124$y\_roi$ and 124$z\_roi$ labeled with regions of interests (not depicted). After that, the preprocessing module 130 assigns 122$x\_roi$, 122$y\_roi$ and 122$z\_roi$ as the image skeleton data 132 and 124$x\_roi$, 124$y\_roi$ and 124$z\_roi$ as the image skeleton data 134.

In one embodiment of the present disclosure, the preprocessing module 130 is further configured for determining whether there is an edge line or an edge curve which could be used perform further detection in at least one of the regions of interests of the image skeleton data 132 and 134. If not, the preprocessing module 130 outputs the detection result 170 and describes in the decision result 170 that there is no pedestrian in the scene to be detected.

The human detection module 140 is configured for determining whether there is a human characteristic in at least one of the regions of interests of the image skeleton data 132 and 134. If so, the human detection module 140 generates a plurality of corresponding image skeleton data 142 and 144 labeled with regions of human characteristics, If not, the human detection module 140 outputs the detection result 170 and describes in the decision result 170 that there is no pedestrian in the scene to be detected.

In an embodiment of the present disclosure, the image skeleton data 132 are three different-resolution image skeleton data 132x, 132y and 132z labeled with regions of interests, and the image skeleton data 134 are three different-resolution image skeleton data 134x, 134y and 134z labeled with regions of interests (not depicted). The human detection module 140 is configured for performing human characteristic detections in the regions of interests of 132x, 132y, 132z, 134x, 134y and 134z. Then the human detection module 140 labels regions of human characteristics in the abovementioned 6 image skeleton data according to detected human characteristics to generate image skeleton data 132x_p, 132y_p, 132z_p, 134x_p, 134y_p and 134z_p labeled with regions of human characteristics (not depicted). If there is a human characteristic in the regions of interests of 132x, 132y, 132z, 134x, 134y or 134z, the human detection module 140 assigns 132x_p, 132y_p, 132z_p as the image skeleton data 142 labeled with regions of human characteristics, and 134x_p, 134y_p, 134z_p as the image skeleton data 144 labeled with regions of human characteristics. On the contrary, if there is no human characteristic in the regions of interests of 132x, 132y, 132z, 134x, 134y or 134z, the human detection module 140 outputs the detection result 170 and describes in the decision result 170 that there is no pedestrian in the scene to be detected.

In an embodiment of the present disclosure, the human detection module 140 includes a head-and-shoulder detection unit (not depicted), the head-and-shoulder detection unit is configured for determining whether there is a human head or a human shoulder characteristic in the regions of interests of the image skeleton data 132 and 134 according to a plurality of normal vector angle data in the regions of interests of the image skeleton data 132 and 134. In the abovementioned embodiment, if the head-and-shoulder detection unit determines there is a human head or a human shoulder characteristic in the regions of interests of an image skeleton data, the human detection module 140 determines there is a human characteristic in the regions of interests of that image skeleton data accordingly. In the following paragraph, we will further explain how the abovementioned head-and-shoulder detection unit determines whether there is a human head or a human shoulder characteristic in the regions of interests of an image skeleton data according to a plurality of normal vector angle data in the regions of interests of the image skeleton data.

Figure 3:
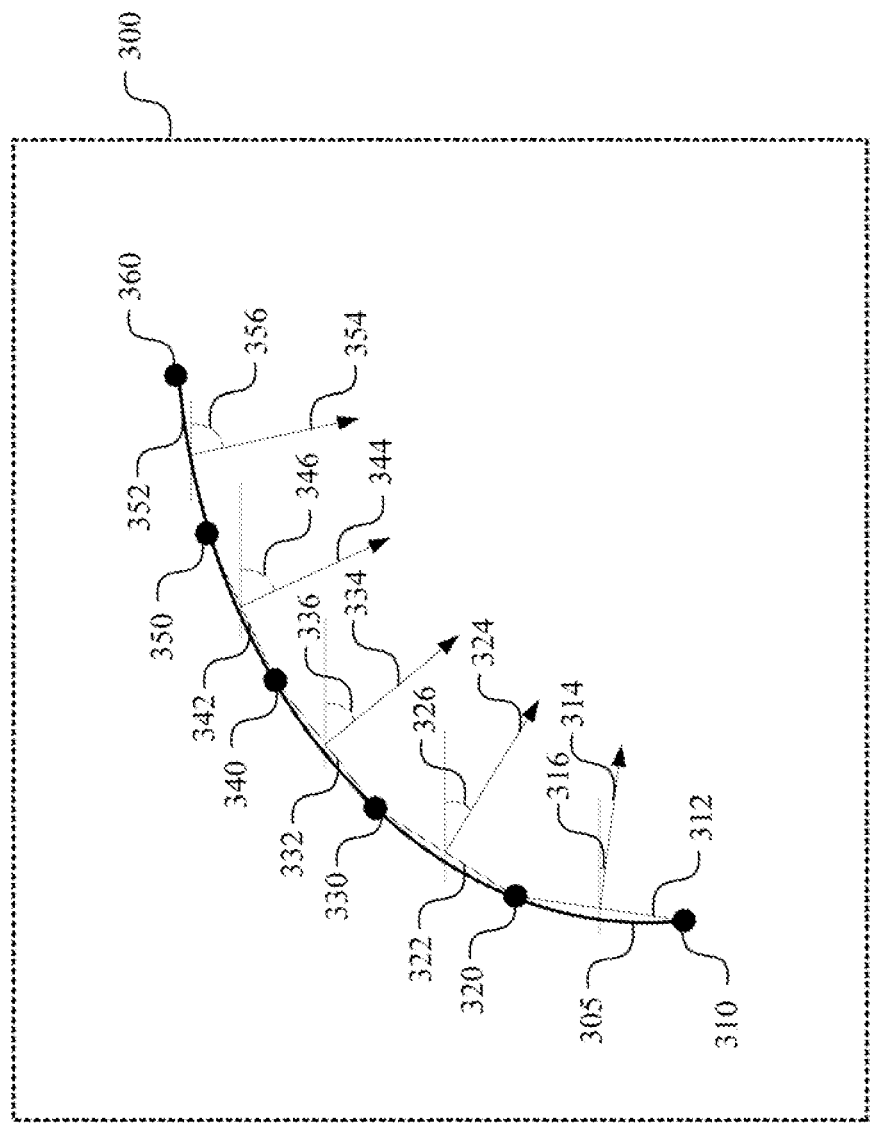
FIG. 3 is a schematic diagram of how the head-and-shoulder detection unit determines whether there is a human head or a human shoulder characteristic in a region of interests in accordance with one embodiment of the present disclosure.

Please refer to FIG. 3 simultaneously. FIG. 3 is a schematic diagram of how the head-and-shoulder detection unit determines whether there is a human head or a human shoulder characteristic in a region of interests 300 in accordance with one embodiment of the present disclosure.

The region of interests 300 includes a curve 305. The curve 305 consists of pixels 310. 320, 330, 340, 350 and 360. First, the head-and-shoulder detection unit connects pixels 310 and 320 to generate a line 312, connects pixels 320 and 330 to generate a line 322, connects pixels 330 and 340 to generate a line 332, connects pixels 340 and 350 to generate a line 342, and connects pixels 350 and 360 to generate a line 352. Then the head-and-shoulder detection unit generates corresponding normal vectors 314, 324, 334, 344 and 354 of the lnes 312, 322, 332, 342 and 352, respectively. After that, the head-and-shoulder detection unit computes the angles 316, 326, 336, 346 and 356 between the normal vectors 314, 324, 334, 344 and 354 and the horizontal line, respectively. The head-and-shoulder detection unit then estimates the shape of the curve 305 according to the angles 316, 326, 336, 346 and 356. Following up, the head-and-shoulder detection unit determines whether the curve 305 is a human head or a human shoulder according to the estimated shape of the curve 305. If so, the head-and-shoulder detection unit determines the region of interests 300 includes a human head or a human shoulder characteristic.

In an embodiment of the present disclosure, the human detection module 140 includes a body detection unit. The body detection unit is configured for comparing a plurality of distance and angle data in the regions of interests of the image skeleton data 132 and 134 with a sample data, and determining whether there is a human body characteristic in the regions of interests of the image skeleton data 132 and 134 according to comparing results. In this embodiment, if the body detection unit determines there is a human body characteristic in the regions of interests of an image skeleton data, the human detection module 140 determines there is a human characteristic in the regions of interests of that image skeleton data accordingly. In the following paragraph, we will further explain how the abovementioned body detection unit determines whether there is a human body characteristic in the regions of interests of an image skeleton data according to a plurality of distance and angle data in the regions of interests of the image skeleton data.

Figure 4:
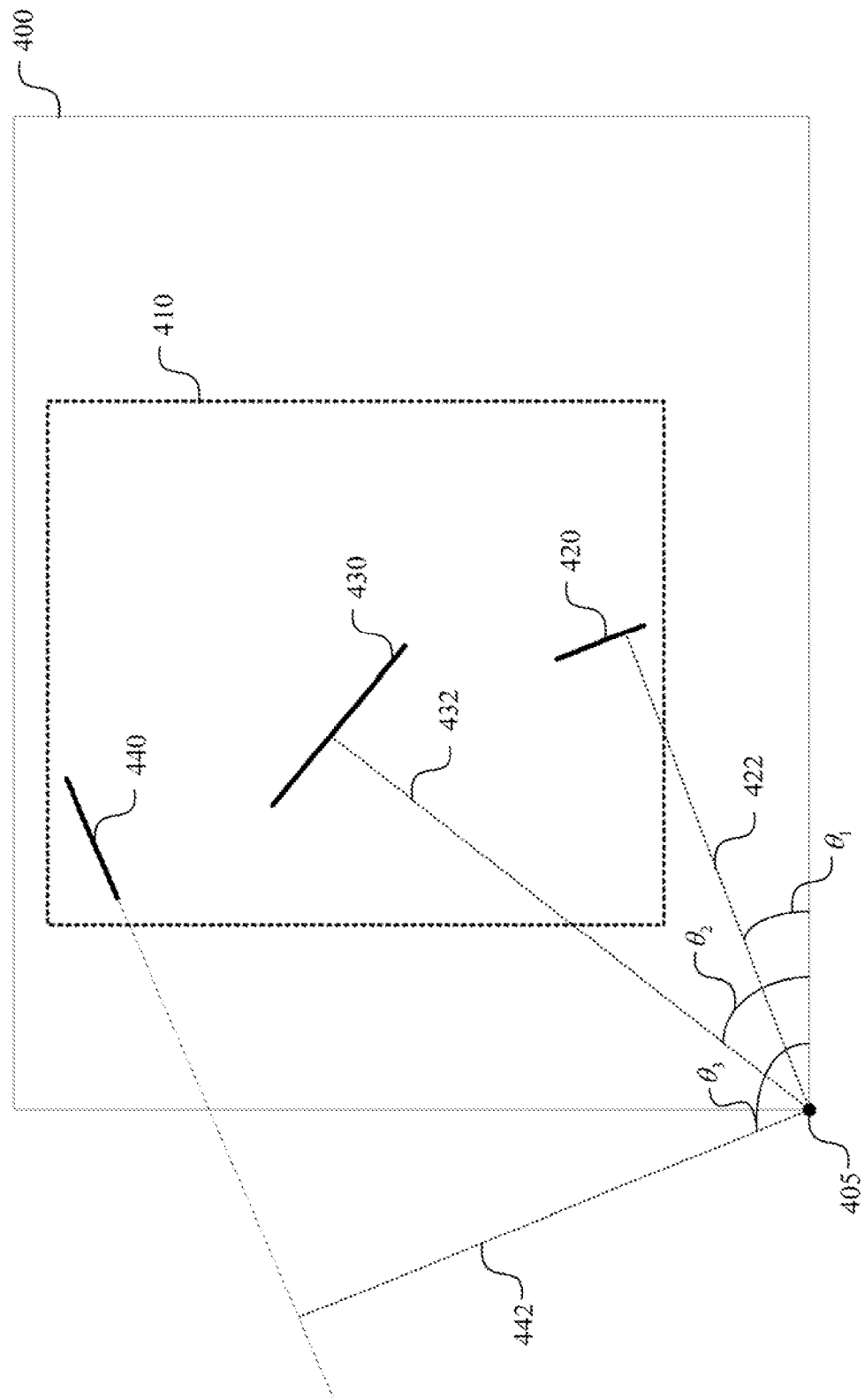
FIG. 4 is a schematic diagram of how the body detection unit determines whether there is a human body characteristic in a region of interests of an image skeleton data in accordance with one embodiment of the present disclosure.

Please refer to FIG. 4 simultaneously. FIG. 4 is a schematic diagram of how the body detection unit determines whether there is a human body characteristic in a region of interests 410 of an image skeleton data 400 in accordance with one embodiment of the present disclosure. The region of interests 410 includes lines 420, 430 and 440. A node 405 is located in the left-bottom corner of the image skeleton data 400. The body detection unit first generates vertical lines 422, 432 and 442 between the lines 420, 430 and 440, and the node 405. The body detection unit then estimates the lengths r_1, r_2 and r_3 (not depicted) of the lines 422, 432 and 442 (r_1, r_2 and r_3 are distances between the lines 420, 430 and 440, and the node 405). After that, the body detection unit estimates the angles $\theta_1$, $\theta_2$ and $\theta_3$ between the lines 422, 432 and 442 and the horizontal line. The body detection unit then converts angles $\theta_1$, $\theta_2$ and $\theta_3$, and distances r_1, r_2 and r_3 to coordinates ($\theta_1$, r_1), ($\theta_2$, r_2) and ($\theta_3$, $r_{13}$ 3) and plots a coordinate diagram according to the abovementioned three coordinates. It has to be noted that the location of the node 405 is not limited to the left-bottom corner of the image skeleton data 400. In another embodiment of the present disclosure, the location of the node 405 is located at the right-bottom corner of an image skeleton data.

Figure 5:
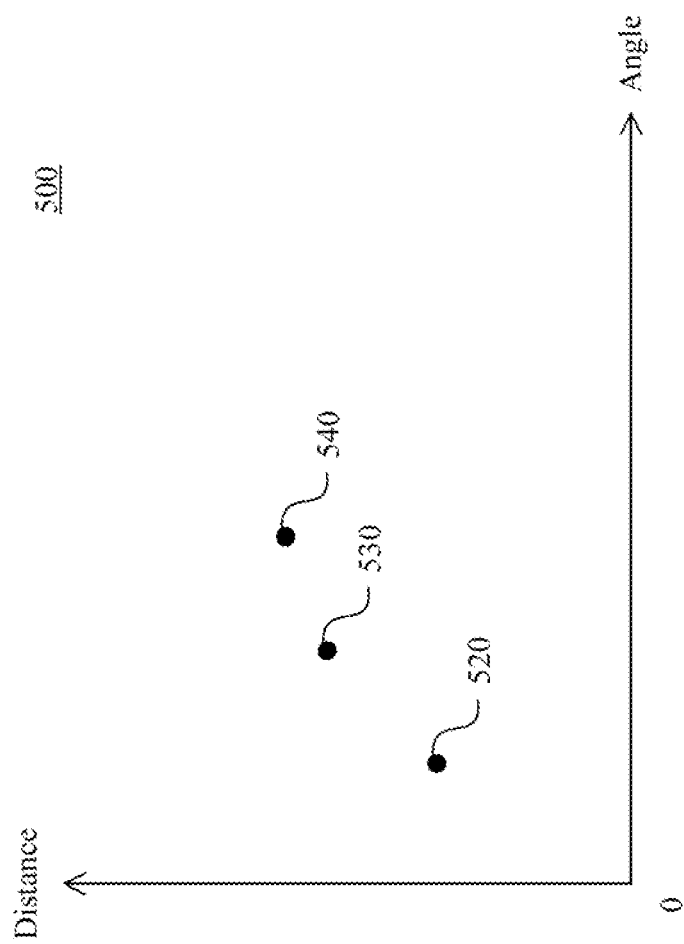
FIG. 5 is a coordinate diagram utilized by the body detection unit to determine whether there is a human body characteristic in a region of interests of an image skeleton data in accordance with one embodiment of the present disclosure.

Please refer to FIG. 5 simultaneously. FIG. 5 is a coordinate diagram 500 plotted according to the abovementioned three coordinates. In the coordinate diagram 500, a coordinate 520 represents the coordinate ($\theta_1$, r_1), a coordinate 530 represents the coordinate ($\theta_2$, r_2), and a coordinate 540 represents the coordinate ($\theta_3$, r_3). The body detection unit then compares the coordinate diagram 500 with a sample data, in which the sample data includes a region in a coordinate diagram. The abovementioned region in the coordinate diagram is generated by performing an algorithm machine training with a mass amount of images including scenes with pedestrians as input. If the coordinates 520, 530 and 540 are in the abovementioned region, the body detection unit determines there is a human body characteristic in the region of interests 410.

The image-stitching module 150 is configured for stitching the detection image data 122 and 124 to generate at least one detection image data 154. The image-stitching module 150 can include the connectivity analysis unit 152. The connectivity analysis unit 152 is configured for performing an encoding for each of the regions of human characteristics of the image skeleton data 142 and 144 and stitching the detection image data 122 and 124 to generate at least one detection image data 154 according to encoding results.

In one embodiment of the present disclosure, the image skeleton data 142 are three different-resolution image skeleton data 142x, 142y and 142z labeled with regions of human characteristics, and the image skeleton data 144 are three different-resolution image skeleton data 144x, 144y and 144z labeled with regions of human characteristics (not depicted). The detection image data 122 are three different-resolution detection image data 122x, 122y and 122z, and the detection image data 124 are three different-resolution detection image data 124x, 124y and 124z (not depicted). The resolution of 122x, 124x, 142x, and 144x are the same; the resolution of 122y, 124y, 142y, and 144y are the same; and the resolution of 122z, 124z, 142z, and 144z re the same. The connectivity analysis unit 152 is configured for performing a run-length coding for each of the regions of human characteristics of the image skeleton data 142x, 142y, 142z, 144x, 144y, and 144z. The connectivity analysis unit 152 then compares the encoding results of 142x and 144x to generate an image edge. After that, the connectivity analysis unit 152 stitches 122x and 124x at the location of the abovementioned image edge accordingly to generate a detection image data 154x (not depicted). Similarly, the connectivity analysis unit 152 is configured for comparing the encoding results of 142y and 144y to generate an image edge and stitching 122y and 124y at the location of the abovementioned image edge accordingly to generate a detection image data 154y (not depicted); and comparing the encoding results of 142z and 144z to generate an image edge and stitching 122z and 124z at the location of the abovementioned image edge accordingly to generate a detection image data 154z (not depicted). In the present disclosure, the detection image data 154 includes 154x, 154y and 154z.

The decision module 160 is configured for generating and outputting the detection result 170 according to the detection image data 154. The decision module 160 could include a histogram of oriented gradients generator 162 and a linear support vector machine unit 166. The histogram of oriented gradients generator 162 is configured for generating at least one histogram of oriented gradients 164 according to the detection image data 154. The linear support vector machine unit 166 is configured for generating and outputting the detection result 170 according to the histograms of oriented gradients 164.

In one embodiment of the present disclosure, the detection image data 154 are three different-resolution detection image data 154x, 154y and 154z. The histogram of oriented gradients generator 162 is configured for normalizing the gamma and the color of the detection image data 154x, 154y and 154z, and computing the histograms of oriented gradients 164x, 164y and 164z of the detection image data 154x, 154y and 154z according to normalization results. The histograms of oriented gradients 164x, 164y and 164z are included in the histograms of oriented gradients 164. The linear support vector machine unit 166 is configured for comparing the histograms of oriented gradients 164x, 164y and 164z included in the histograms of oriented gradients 164 with a sample database to determine whether there is a pedestrian in the detection image data 154x, 154y and 154z. In the present embodiment, if the linear support vector machine unit 166 determines there is a pedestrian in at least one of the detection image data 154x, 154y and 154z, the linear support vector machine unit 166 outputs the detection result 170 and describes in the decision result 170 that there is a pedestrian in the scene to be detected. On the contrary, if the linear support vector machine unit 166 determines there is no pedestrian in the detection image data 154x, 154y and 154z, the linear support vector machine unit 166 outputs the detection result 170 and describes in the decision result 170 that there is no pedestrian in the scene to be detected.

Figure 6:
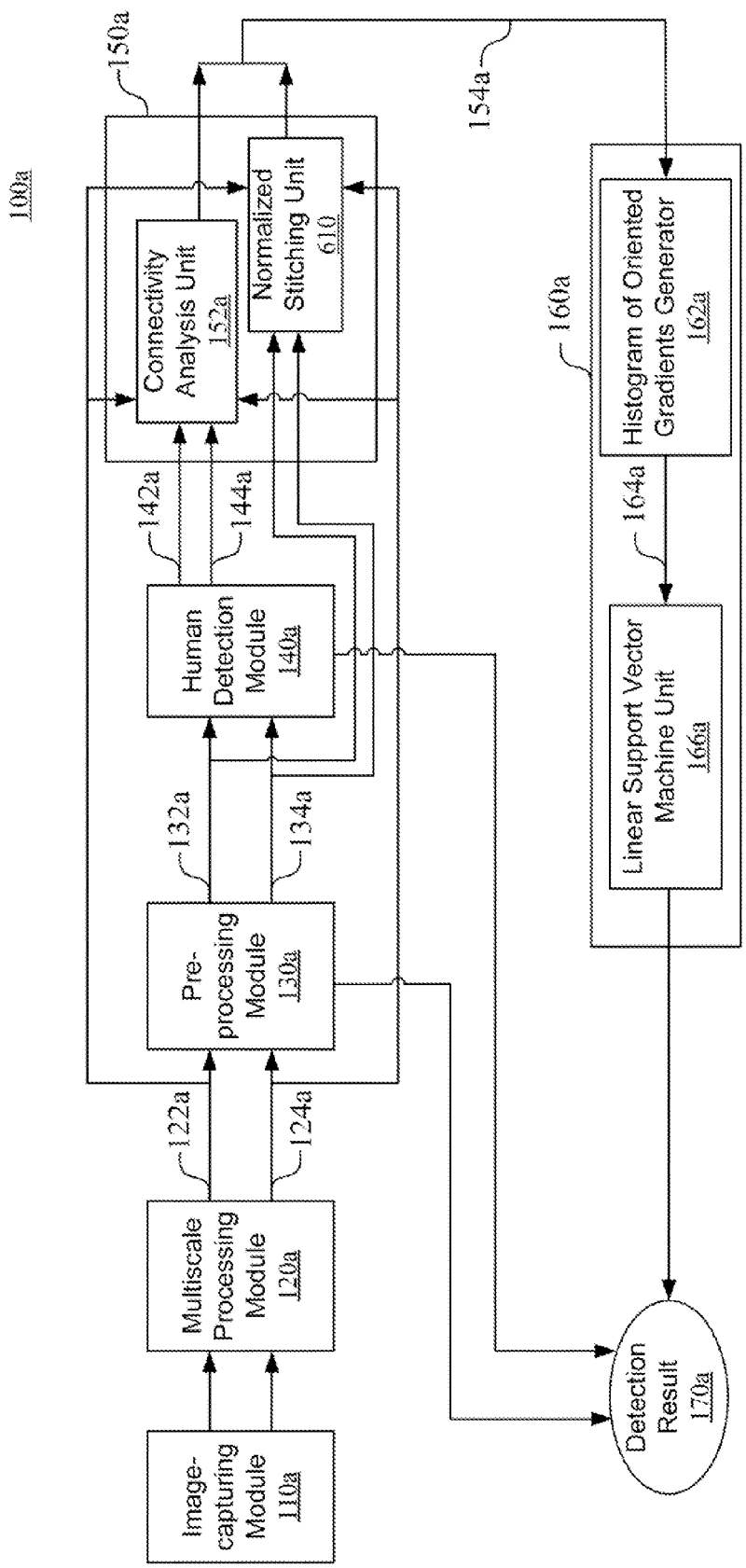
FIG. 6 is a schematic diagram of a pedestrian detection system in accordance with one embodiment of the present disclosure.

Please refer to FIG. 6. FIG. 6 is a schematic diagram of a pedestrian detection system 100a in accordance with one embodiment of the present disclosure.

The pedestrian detection system 100a includes an image-capturing module 110a, a multiscale processing module 120a, preprocessing module 130a, a human detection module 140a, an image-stitching module 150a and a decision module 160a. The image-capturing module 110a, the multiscale processing module 120a, the preprocessing module 130a, the human detection module 140a and the decision module 160a can be the image-capturing module 110, the multiscale processing module 120, the preprocessing module 130, the human detection module 140 and the decision module 160 illustrated in FIG. 1 respectively. Their functions and operations are similar and hence are not described again herein.

In the present embodiment, the image-stitching module 150a further includes a normalized stitching unit 610, and selectively includes a connectivity analysis unit 152a (the connectivity analysis unit 152a can be the connectivity analysis unit 152 illustrated in FIG. 1, their functions and operations are similar and hence are not described again herein). The normalized stitching unit 610 is configured for stitching the detection image data 122a and 124a to generate detection image data 154a according to characteristics in the regions of interests of the image skeleton data 132a and 134a.

In one embodiment of the present disclosure, the image skeleton data 132a are three different-resolution image skeleton data 132a_x, 132a_y and 132a_z labeled with regions of interests, and the image skeleton data 134a are three different-resolution image skeleton data 134a_x, 134a_y and 134a_z labeled with regions of interests (not depicted). The detection image data 122a are three different-resolution detection image data 122a_x, 122a_y and 122a_z, and the detection image data 124a are three different-resolution detection image data 124a_x, 124a_y and 124a_z (not depicted). The resolution of 122a_x, 124a_x, 132a_x and 134a_x are the same; the resolution of 122a_y, 124a_y, 132a_y, and 134a_y are the same; and the resolution of 122a_z, 124a_z, 132a_z, and 134a_z are the same. The normalized stitching unit 610 is configured for, according to locations of characteristics in the regions of interests of the image skeleton data 132a_x and 134a_x, stitching the detection image data 122a_x and 124a_x at the abovementioned locations correspondingly to generate a detection image data 654x (not depicted). In the same way, the normalized stitching unit 610 is configured for, according to locations of characteristics in the regions of interests of the image skeleton data 132a_y and 134a_y, stitching the detection image data 122a_y and 124a_y at the abovementioned locations correspondingly to generate a detection image data 654y (not depicted); and according to locations of characteristics in the regions of interests of the image skeleton data 132a_z and 134a_z, stitching the detection image data 122a_z and 124a_z at the abovementioned locations correspondingly to generate a detection image data 654z (not depicted). In the present embodiment, the detection image data 154a further includes the abovementioned detection image data 654x, 654y and 654z.

Figure 7:
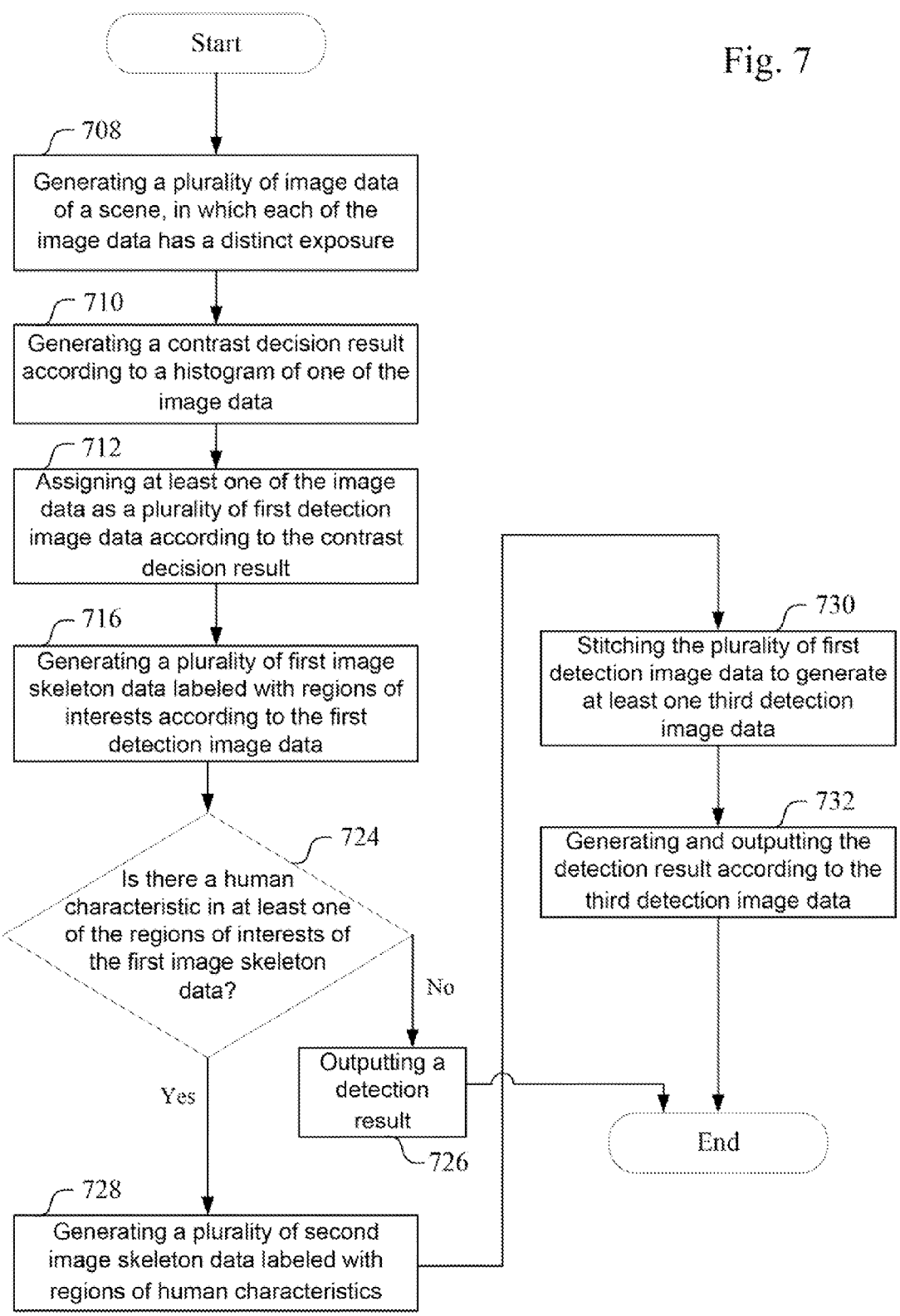
FIG. 7 is a flow chart of a pedestrian detection method in accordance with one embodiment of the present disclosure.

Please refer to FIG. 7. FIG. 7 is a flow chart of a pedestrian detection method in accordance with one embodiment of the present disclosure. The pedestrian detection method may take the form of a computer program product stored on a computer-readable storage medium having computer-readable instructions embodied in the medium. Any suitable storage medium (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. The pedestrian detection method could be applied in the pedestrian detection system 100 illustrated in FIG. 1 and is not limited herein. For convenience and clarity, the following description about the pedestrian detection method is illustrated based on the pedestrian detection system 100 illustrated in FIG. 1.

In step 708, the image-capturing module 110 generates a plurality of image data of the scene, in which each of the image data has a distinct exposure.

In step 710, the image-capturing module 110 generates a contrast decision result according to a histogram of one of the abovementioned image data.

In step 712, the image-capturing module 110 assigns at least one of the abovementioned image data as the detection image data 112 and 114 according to the contrast decision result.

In step 716, the preprocessing module 130 generates the image skeleton data 132 and 134 labeled with regions of interests according to the detection image data 112 and 114.

After that, in step 724, the human detection module 140 determines whether there is a human characteristic in at least one of the regions of interests of the image skeleton data 132 and 134.

If so, in step 728, the human detection module 140 generates the image skeleton data 142 and 144 labeled with regions of human characteristics.

If not, in step 726, the human detection module 140 outputs the detection result 170, and describes in the decision result 170 that there is no pedestrian in the scene to be detected.

Then in step 730, the image-stitching module 150 stitches the detection image data 112 and 114 to generate at least one detection image data 154.

After that, in step 732, the decision module 160 generates and outputs the detection result 170 according to the detection image data 154.

Figure 8:
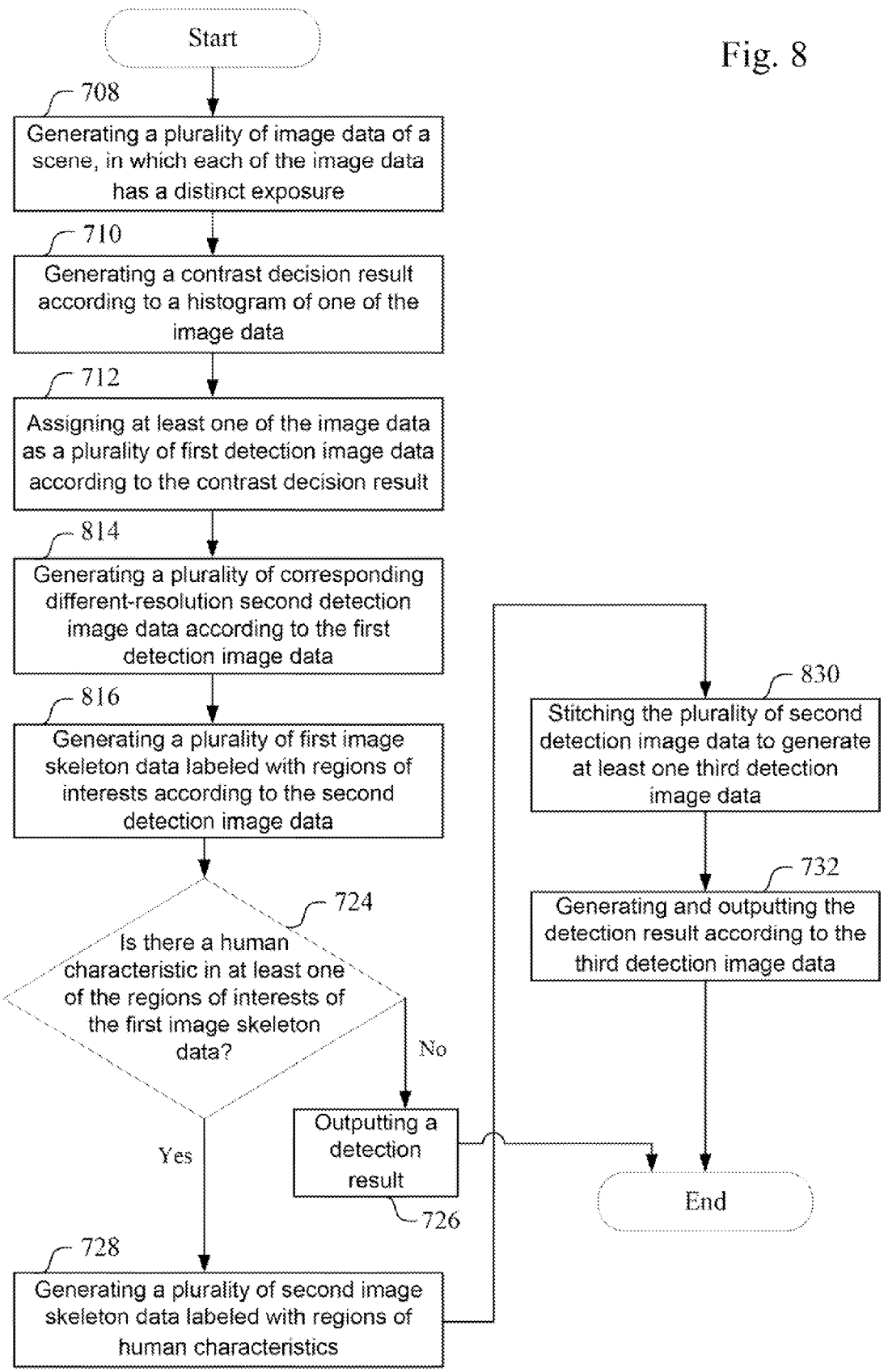
FIG. 8 is a flow chart of a pedestrian detection method in accordance with one embodiment of the present disclosure.

Please refer to FIG. 8. FIG. 8 is a flow chart of a pedestrian detection method in accordance with one embodiment of the present disclosure. Comparing with the pedestrian detection method illustrated in FIG. 7, the pedestrian detection method illustrated in FIG. 8 further includes step 814, 816 and 830. The pedestrian detection method could be applied in the pedestrian detection system 100 illustrated in FIG. 1 and is not limited herein. For convenience and clarity, the following description about the pedestrian detection method is illustrated based on the pedestrian detection system 100 illustrated in FIG. 1.

In step 814, the multiscale processing module generates a plurality of corresponding different-resolution detection image data 122 and 124 according to the detection image data 112 and 114.

In step 816, the preprocessing module 130 generates the image skeleton data 132 and 134 labeled with regions of interests according to the detection image data 122 and 124.

In step 830, the image-stitching module 150 stitches the detection image data 122 and 124 to generate the detection image data 154.

By applying the above embodiments, a pedestrian detection system could read high-exposure and low-exposure image data at the same time to get more precise bright and dark part information of an image in the environments with non-uniform distribution of light. Also, a pedestrian detection system could better recognize large or small objects in an image by identifying different-resolution image data. Moreover, by performing further identifications on the lines or curves in the region which might be a pedestrian, a pedestrian could still be recognized even parts of his/her body are blocked. Therefore, the accuracy of pedestrian detection systems could be improved by applying the techniques disclosed in the present disclosure.

The above illustrations include exemplary operations, but the operations are not necessarily performed in the order shown. Operations may be added, replaced, changed order, and/or eliminated as appropriate, in accordance with the spirit and scope of various embodiments of the present disclosure.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. A pedestrian detection system of detecting whether there is a pedestrian in a scene, comprising:
    an image-capturing module configured for generating a plurality of image data of the scene, wherein each of the image data has a distinct exposure; for generating a contrast decision result according to a histogram of one of the image data; and for assigning at least one of the image data as a plurality of first detection image data according to the contrast decision result;
    a preprocessing module configured for generating a plurality of first image skeleton data labeled with regions of interests according to the first detection image data;
    a human detection module configured for determining whether there is a human characteristic in at least one of the regions of interests of the first image skeleton data; if so, the human detection module generating a plurality of second image skeleton data labeled with regions of human characteristics; and if not, the human detection module outputting a detection result;
    an image-stitching module configured for stitching the plurality of first detection image data to generate at least one third detection image data; and
    a decision module configured for generating and outputting the detection result according to the third detection image data,
    wherein the image-capturing module generates the contrast decision result according to a ratio of the number of pixels within a middle brightness range to the number of all pixels in the histogram, and
    wherein when the ratio is less than a threshold value, the image-capturing module selects two or more image data having distinct exposures from the plurality of image data to serve as the first detection image data; and when the ratio is not less than the threshold value, the image-capturing module selects one image data having an auto exposure (EVO) from the plurality of image data to serve as the first detection image data.

2. The pedestrian detection system of claim 1, further comprising:

a multiscale processing module configured for generating a plurality of corresponding different-resolution second detection image data according to the first detection image data;

the preprocessing module further configured for generating the first image skeleton data labeled with regions of interests according to the second detection image data, and the image-stitching module further configured for stitching the second detection image data to generate the third detection image data.

3. The pedestrian detection system of claim 1, wherein the decision module comprises:

a histogram of oriented gradients generator configured for generating at least one histogram of oriented gradients according to the third detection image data; and a linear support vector machine unit configured for generating and outputting the detection result according to the histograms of oriented gradients.

4. The pedestrian detection system of claim 1, wherein the human detection module comprises a head-and-shoulder detection unit, the head-and-shoulder detection unit is configured for determining whether there is a human head or a human shoulder characteristic in the regions of interests of the first image skeleton data according to a plurality of normal vector angle data in the regions of interests of the first image skeleton data.

5. The pedestrian detection system of claim 1, wherein the human detection module comprises a body detection unit, the body detection unit is configured for comparing a plurality of distance and angle data in the regions of interests of the first image skeleton data with a sample data, and for determining whether there is a human body characteristic in the regions of interests of the first image skeleton data according to comparing results.

6. The pedestrian detection system of claim 1, wherein the image-stitching module further comprises:

a connectivity analysis unit configured for performing an encoding for each of the regions of human characteristics of the second image skeleton data and stitching the first detection image data to generate at least one third detection image data according to encoding results, wherein the encoding is a run-length coding, and the connectivity analysis unit is further configured for stitching the first detection image data to generate the third image data according to image edges generated by the run-length encoding.

7. The pedestrian detection system of claim 1, wherein the image-stitching module further comprises a normalized stitching unit, the normalized stitching unit is configured for stitching the first detection image data to generate the third detection image data according to characteristics in the regions of interests of the first image skeleton data.

8. The pedestrian detection system of claim 1, wherein the preprocessing module is further configured for determining whether there is an edge line or an edge curve which could be used to perform further detection in the regions of interests of the first image skeleton data, and if not, the preprocessing module is further configured for outputting the detection result.

9. A pedestrian detection method of detecting whether there is a pedestrian in a scene, comprising:

generating a plurality of image data of the scene, wherein each of the image data has a distinct exposure;

generating a contrast decision result according to a histogram of one of the image data;

assigning at least one of the image data as a plurality of first detection image data according to the contrast decision result;

generating a plurality of first image skeleton data labeled with regions of interests according to the first detection image data;

determining whether there is a human characteristic in at least one of the regions of interests of the first image skeleton data, if so, generating a plurality of second image skeleton data labeled with regions of human characteristics, and if not, outputting a detection result;

stitching the plurality of first detection image data to generate at least one third detection image data; and generating and outputting the detection result according to the third detection image data;

wherein generating the contrast decision result according to the histogram further comprises:

generating the contrast decision result according to a ratio of the number of pixels within a middle brightness range to the number of all pixels in the histogram, and wherein when the ratio is less than a threshold value, selects two or more image data having distinct exposures from the plurality of image data to serve as the first detection image data; and when the ratio is not less than the threshold value, selects one image data having an auto exposure (EVO) from the plurality of image data to serve as the first: detection image data.

10. The pedestrian detection method of claim 9, further comprising:

generating a plurality of corresponding different-resolution second detection image data according to the first detection image data;

generating the first image skeleton data labeled with regions of interests according to the second detection image data; and stitching the second detection image data to generate the third detection image data.

11. The pedestrian detection method of claim 9, wherein generating and outputting the detection result according to the third detection image data further comprises:

generating at least one histogram of oriented gradients according to the third detection image data ;and generating and outputting the detection result according to the histograms of oriented gradients.

12. The pedestrian detection method of claim 9, wherein determining whether there is a human characteristic in at least one of the regions of interests of the first image skeleton data further comprises:

determining whether there is a human head or a human shoulder characteristic in the regions of interests of the first image skeleton data according to a plurality of normal vector angle data in the regions of interests of the first image skeleton data.

13. The pedestrian detection method of claim 9, wherein determining whether there is a human characteristic in at least one of the regions of interests of the first image skeleton data further comprises:

comparing a plurality of distance and angle data in the regions of interests of the first image skeleton data with a sample data, and for determining whether there is a human body characteristic in the regions of interests of the first image skeleton data according to comparing results.

14. The pedestrian detection method of claim 9, wherein stitching the first detection image data to generate the third detection image data further comprises:
  performing an encoding for each of the regions of human characteristics of the second image skeleton data, and stitching the first detection image data to generate the third detection image data according to encoding results, wherein the encoding is a run-length coding, and stitching the first detection image data to generate the third detection image data according to encoding results further comprises:
  stitching the first detection image data according to image edges generated by the run-length coding to generate the third image data.

15. The pedestrian detection method of claim 9, wherein stitching the first detection image data to generate the third detection image data further comprises:
  stitching the first detection image data to generate the third detection image data according to characteristics in the regions of interests of the first image skeleton data.

16. The pedestrian detection method of claim 9, wherein generating the first image skeleton data labeled with regions of interests according to the first detection image data further comprises:
  determining whether there is an edge line or an edge curve which could be used to perform further detection in the regions of interests of the first image skeleton data, and if not, outputting the detection result.

\* \* \* \* \*